US007234757B2

(12) United States Patent
Mitchell

(10) Patent No.: US 7,234,757 B2
(45) Date of Patent: Jun. 26, 2007

(54) ELECTROMECHANICAL STRUT

(75) Inventor: Stephen A. G. Mitchell, Pickering (CA)

(73) Assignee: Magna Closures Inc., Newmarket, Ontario (CA)

(*) Notice: Subject to any disclaimer, the term of this patent is extended or adjusted under 35 U.S.C. 154(b) by 38 days.

(21) Appl. No.: 11/199,470

(22) Filed: Aug. 8, 2005

(65) Prior Publication Data

US 2006/0082188 A1 Apr. 20, 2006

Related U.S. Application Data

(60) Provisional application No. 60/599,742, filed on Aug. 6, 2004.

(51) Int. Cl.
*B60J 5/10* (2006.01)

(52) U.S. Cl. ...................................... 296/146.8; 296/56

(58) Field of Classification Search ............. 296/146.8, 296/56

See application file for complete search history.

(56) References Cited

U.S. PATENT DOCUMENTS 2,371,336 A 3/1945 Levon
2,738,972 A 3/1956 Morris
5,187,993 A * 2/1993 Nicholson et al. ......... 74/89.38
5,295,407 A * 3/1994 Hirose et al. .............. 74/89.37
5,367,826 A 11/1994 Wu
5,944,376 A * 8/1999 Buchanan, Jr. .......... 296/146.4
6,185,868 B1 2/2001 Kato
6,516,567 B1 2/2003 Stone et al.
6,755,458 B1 6/2004 Oberheide

* cited by examiner

*Primary Examiner*—Dennis H. Pedder
(74) *Attorney, Agent, or Firm*—Clark Hill PLC

(57) ABSTRACT

An electromechanical strut using an inline motor coupled to an inline planetary gear that are both mounted in the lower housing. The motor-gear assembly drives a worm gear and nut screw in the upper housing, extending or retracting an extensible shaft. Additionally, a power spring mounted coaxially around the worm gear provides a mechanical counterbalance to the weight of a lift gate on the shaft. As the shaft extends, the power spring uncoils, assisting the motor-gear assembly in raising the lift gate. Retracting the shaft recoils the spring, storing potential energy. Thus, a lower torque motor-gear assembly can be used, reducing the diameter of the lower housing. Preferably, the power spring can also drive the power screw to extend the strut even when the motor-gear assembly is not engaged.

13 Claims, 2 Drawing Sheets

ELECTROMECHANICAL STRUT

This application claims priority of Provisional Patent Application Ser. No. 60/599,742, filed Aug. 6, 2004, entitled "Electromechanical Strut".

FIELD OF THE INVENTION

The present invention relates to an electrically-driven, mechanical strut. More specifically, the present invention relates to an electromechanical strut used to raise or lower an automotive lift gate.

BACKGROUND OF THE INVENTION

Lift gates provide a convenient access to the cargo areas of hatchbacks, wagons and other utility vehicles. Typically, the lift gate is hand operated, requiring manual effort to move the lift gate between the open and the closed positions. Depending on the size and weight of the lift gate, this effort can be difficult for some users. Additionally, manually opening or closing a lift gate can be inconvenient, particularly when the user's hands are full.

Attempts have been made to reduce the effort and inconvenience of opening or closing a lift gate. One solution is to pivotally mount gas struts to both the vehicle body and the lift gate, reducing the force required for opening the lift gate. However, the gas struts also hinder efforts to close the lift gate, as the struts re-pressurize upon closing, increasing the effort required. Additionally, the efficacy of the gas struts vary according to the ambient temperature. Furthermore, the use of gas struts still requires that the lift gate is manually opened and closed.

U.S. Pat. No. 6,516,567 to Stone et al. (hereafter referred to as the '567 patent) provides a power actuator that works in tandem with a gas strut. The '567 power actuator comprises a motor mounted within the vehicle body coupled to a flexible rotary cable by a clutch. The flexible rotary cable drives an extensible strut that is pivotally mounted to both the vehicle body and the lift gate. Thus, the motor can raise or lower the lift gate conveniently without manual effort. A controller to engage and disengage the motor can be connected to a remote key fob button or a button in the passenger compartment, providing additional convenience.

The power actuator described in the '567 patent is not without its disadvantages. The power actuator is comprised of multiple parts, each of which needs to be assembled and mounted to the vehicle separately, increasing costs. The vehicle body must be specifically designed provide a space to house the motor. Due to the limited space available, the motor is small and requires the assistance of the gas strut. Additionally, because the power actuator described in the '567 patent is designed to work in tandem with a gas strut, the gas strut can still vary in efficacy due to temperature. Thus, the motor provided must be balanced to provide the correct amount of power with varying degrees of mechanical assistance from the gas strut.

It is therefore desired to provide a means for raising or lowering a vehicle lift gate that obviates or mitigates at least one of the above identified disadvantages of the prior art.

SUMMARY OF THE INVENTION

According to an embodiment of the invention, an electromechanical strut is provided for moving a pivotal lift gate in a motor vehicle body between a closed and an open position. The electromechanical strut comprises a housing, pivotally mountable to one of the motor vehicle body and the lift gate; an extensible shaft, one end of the shaft being slidably mounted to the housing, and the other end of the shaft being pivotally mounted to the other of the motor vehicle body and the lift gate; a drive mechanism, comprising a power screw, for converting rotary motion into linear motion of the extensible shaft in order to move it between a position corresponding to the closed position of the liftgate and an extended position corresponding to the open position of the liftgate; and a power spring, connected to the power screw within the housing, which assists the power screw.

The present invention provides an electromechanical strut using an inline motor coupled to an inline planetary gear that are both mounted in the housing. The motor-gear assembly drives a power screw and nut assembly in the upper housing, extending or retracting an extensible shaft. Additionally, a power spring mounted coaxially around the power screw urges the extensible shaft to the extended position and provides a mechanical counterbalance to the weight of a lift gate on the shaft. As the shaft extends, the power spring uncoils, assisting the motor-gear assembly in raising the lift gate. Retracting the shaft recoils the spring, storing potential energy. Thus, a lower torque motor-gear assembly can be used, reducing the diameter of the housing.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
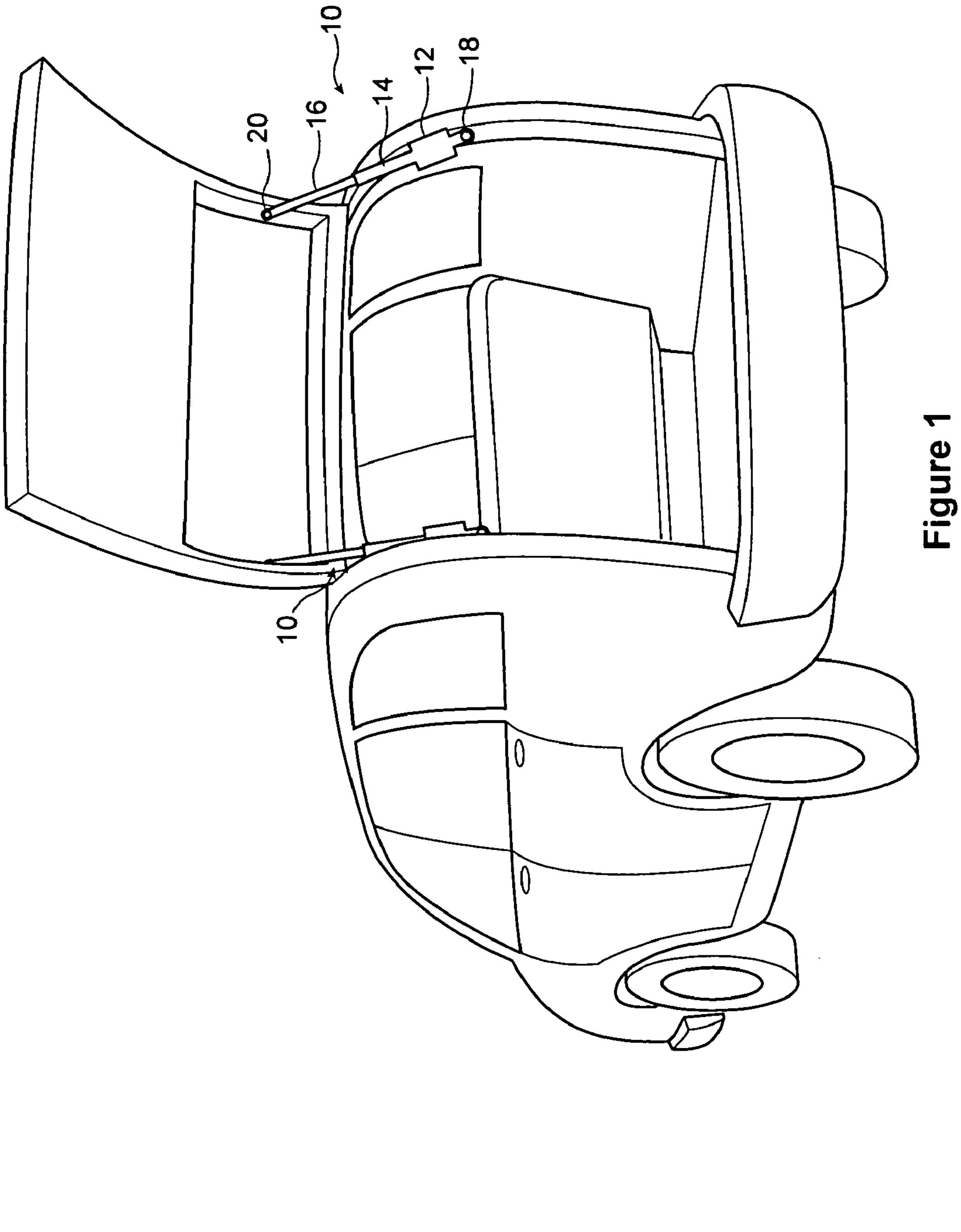
FIG. 1 shows a perspective view of a motor vehicle having a lift gate controlled by a pair of electromechanical struts in accordance with the invention.
Figure 2:
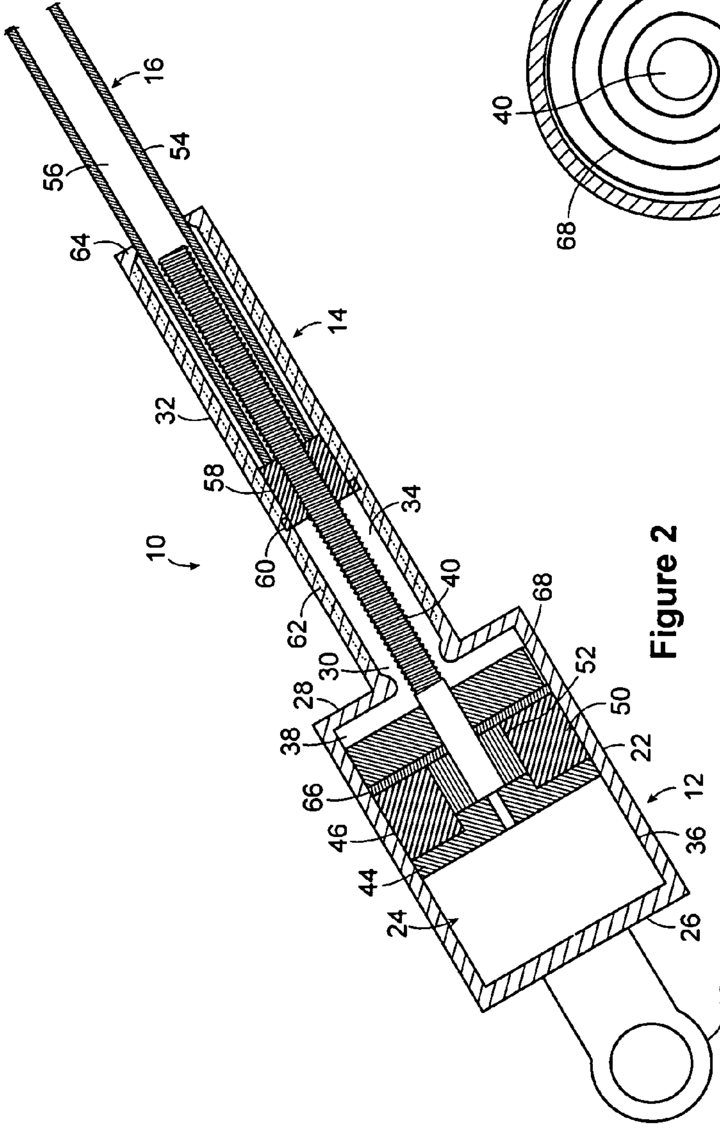
FIG. 2 shows a cross-section view in side profile of one of the electromechanical struts shown in FIG. 1, shown in an extended position.
Figure 3:
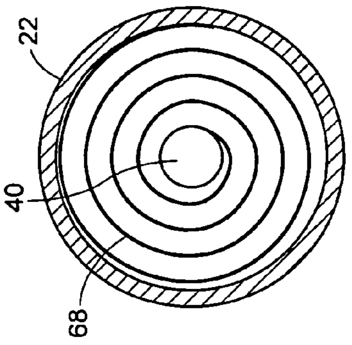
FIG. 3 shows a cross-section view in top profile of a spring housing on the electromechanical strut shown in FIG. 2.

Referring now to FIGS. 1 and 2, an embodiment of the invention mounted to a motor vehicle is shown generally at 10. Electromechanical strut 10 includes a lower housing 12, an upper housing 14, and an extensible shaft 16. A pivot mount 18, located at an end of lower housing 18 is pivotally mounted to a portion of the vehicle body that defines an interior cargo area in the vehicle. A second pivot mount 20 is attached to the distal end of extensible shaft 16, relative to upper housing 18, and is pivotally mounted to the lift gate of the vehicle.

Referring now to FIG. 2, the interior of lower housing 12 is shown in greater detail. Lower housing 12 provides a cylindrical sidewall 22 defining a chamber 24. Pivot mount 18 is attached to an end wall 26 of lower housing 12 proximal to the vehicle body (not shown). Upper housing 14 provides a cylindrical sidewall 32 defining a chamber 34 that is open at both ends. A distal end wall 28 of lower housing 12 includes an aperture 30 so that chamber 24 and chamber 34 communicate with each other. Preferably, upper housing 14 has a smaller diameter than lower housing 12. However, it is contemplated that lower housing 12 and upper housing 14 can also be formed as a single cylinder or frusto-cone. Other form factors for lower housing 12 and upper housing 14 will occur to those of skill in the art. Upper housing 14 can be integrally formed with lower housing 12, or it can be secured to lower housing 12 through conventional means (threaded couplings, weld joints, etc). A motor-gear assembly 36 is seated in chamber 24.

Motor-gear assembly 36 includes a motor 42, a clutch 44, a planetary gearbox 46, and a power screw 40. Motor 42 is mounted within chamber 24 near end wall 26. Preferably, motor 42 is secured to at least one of cylindrical sidewall 32 and end wall 26 to prevent undesired vibrations or rotation. Motor 42 is preferably a direct current bi-directional motor. Electrical power and direction control for motor 42 is provided via electrical cables that connect into the vehicle body (not shown) through apertures in end wall 26 (not shown). The clutch 44 is connected to an output shaft 48 on motor 42. Clutch 44 provides a selective engagement between the output shaft 48 of motor 42 and the planetary gearbox 46. Preferably, clutch 44 is an electromechanical tooth clutch that engages planetary gearbox 46 when motor 42 is activated. When clutch 44 is engaged, torque is transferred from motor 42 through to planetary gearbox 46. When clutch 44 is disengaged, torque is not transferred between motor 42 and planetary gearbox 46 so that no back drive occurs if the lift gate is closed manually.

Planetary gearbox 46 is preferably a two-stage planetary gear that provides torque multiplication for power screw 40. A ring gear 50 is driven by the teeth of clutch 44. In turn, a number of planetary gears 52 transfer power from ring gear 50 to power screw 40, which is centrally journaled within planetary gearbox 46, providing the desired gear ratio reduction to power screw 40. In the present embodiment, planetary gearbox 46 provides a 47:1 gear radio reduction. Other gear ratio reductions will occur to those of skill in the art. Power screw 40 extends through spring housing 38 into upper housing 14.

Extensible shaft 16 provides a cylindrical sidewall 54 defining a chamber 56 and is concentrically mounted between upper housing 14 and power screw 40. As described earlier, pivot mount 20 is attached to the distal end of extensible shaft 16. The proximal end of extensible shaft 16 is open. A drive nut 58 is mounted around the proximal end of extensible shaft 16 relative to lower housing 12 and is coupled with power screw 40 in order to convert the rotational movement of power screw 40 into the linear motion of the extensible shaft 16 along the axis of power screw 40. Drive nut 58 includes two splines 60 that extend into opposing coaxial slots 62 provided on the inside of upper housing 14 to prevent drive nut 58 from rotating. The length of slots 62 defines the retracted and the extended positions of extensible shaft 16. Alternatively, a ball screw assembly could be used in lieu of drive nut 58 without departing from the scope of the invention. An integrally-formed outer lip 64 in upper housing 14 provides an environmental seal between chamber 34 and the outside.

A spring housing 38 is provided in lower housing 12 and is defined by cylindrical sidewall 22, end wall 28, and a flange 66. Within spring housing 38, a power spring 68 is coiled around power screw 40, providing a mechanical counterbalance to the weight of the lift gate. Preferably formed from a strip of steel, power spring 68 assists in raising the lift gate both in its powered and un-powered modes. One end of power spring 68 attaches to power screw 40 and the other is secured to a portion of cylindrical sidewall 22. When extensible shaft 16 is in its retracted position, power spring 68 is tightly coiled around power screw 40. As power screw 40 rotates to extend extensible shaft 16, power spring 68 uncoils, releasing its stored energy and transmitting an axial force through extensible shaft 16 to help raise the lift gate. When power screw 40 rotates to retract extensible shaft 16, power spring 68 recharges by recoiling around power screw 40.

Preferably, power spring 68 stores sufficient energy when coiled to drive power screw 40 to fully raise the lift gate, even when motor gear assembly 36 is not engaged (typically by unlatching the lift gate to raise it manually). In addition to assisting to drive power screw 40, power spring 68 provides a preloading force that reducing starting resistance and wear for motor 42. Furthermore, power spring 68 provides dampening assistance when the lift gate is closed. Unlike a gas strut, power spring 68 is generally not affected by temperature variations, nor does it unduly resist manual efforts to close the lift gate. Although the present embodiment describes power spring 68 that uncoils to assist in raising a lift gate and recoils to lower a lift gate, it has been contemplated that a power spring 68 could be provided that uncoils when lowering a lift gate and recoils when raising a lift gate.

The above-described embodiments of the invention are intended to be examples of the present invention and alterations and modifications may be effected thereto, by those of skill in the art, without departing from the spirit of the invention.

What is claimed is:

1. An electromechanical strut for moving a pivotal lift gate in a motor vehicle body between a closed and an open position, the electromechanical strut comprising:

- a housing, pivotally mountable to one of the motor vehicle body and the lift gate;
- an extensible shaft, one end of the shaft being slidably mounted to the housing, and the other end of the shaft being pivotally mounted to the other of the motor vehicle body and the lift gate;
- a drive mechanism, comprising a power screw, for converting rotary motion into linear motion of the extensible shaft in order to move the extensible shaft between a retracted position corresponding to the closed position of the liftgate and an extended position corresponding to the open position of the liftgate; and
- a mechanical spring disposed within the housing and kinematically connected to the extensible shaft for providing a counterforce against the weight of the liftgate.

2. The electromechanical strut of claim 1, wherein the mechanical spring includes one end attached to the power screw and another end secured to the housing.

3. The electromechanical strut of claim 2 including a drive nut secured to the extensible shaft and threadingly engaged to the power screw.

4. The electromechanical strut of claim 1 including a motor-gear assembly mounted within the housing for reversibly actuating the drive mechanism.

5. The electromechanical strut of claim 4, wherein the motor-gear assembly includes a motor, a clutch coupled to the output of the motor, and a gear reducer selectively coupled to the clutch, and the power screw is coupled to the gear reducer.

6. The electromechanical strut of claim 5, wherein the gear reducer is a planetary gear box.

7. The electromechanical strut of claim 3, wherein the mechanical spring is coiled around the power screw such that movement of the extensible shaft relative to the housing uncoils and recoils the spring.

8. An electromechanical strut for moving a liftgate about a motor vehicle body between a closed position and an open position, the electromechanical strut comprising:

- a housing mountable to one of the liftgate and the motor vehicle body;
- an extensible shaft disposed within the housing and slidable relative thereto, the extensible shaft mountable to the other of the liftgate and the motor vehicle body;
- a drive mechanism including a rotatable power screw, the drive mechanism converting rotary motion of the power screw into linear motion of the extensible shaft to move the extensible shaft between a retracted position corresponding to the closed position of the liftgate and an extended position corresponding to the open position of the liftgate; and
- a spring disposed within the housing and coiled around the power screw for providing a counterforce against the weight of the lifigate.

9. The electromechanical strut of claim 8 wherein the spring uncoils and recoils as the extensible shaft moves relative to the housing.

10. The electromechanical strut of claim 9 including a drive nut secured to the extensible shaft and threadingly engaging the power screw.

11. An electromechanical strut for moving a lifigate about a motor vehicle body between a closed position and an open position, the electromechanical strut comprising:

- a housing mountable to one of the lifigate and the motor vehicle body;
- an extensible shaft disposed within the housing and slidable relative thereto, the extensible shaft mountable to the other of the liftgate and the motor vehicle body;
- a drive mechanism including a rotatable power screw, the drive mechanism converting rotary motion of the power screw into linear motion of the extensible shaft to move the extensible shaft between a retracted position corresponding to the closed position of the liftgate and an extended position corresponding to the open position of the liftgate; and
- a coiled spring disposed within the housing and operably coupled to the extensible shaft for providing a counterforce against the weight of the liftgate.

12. The electromechanical strut of claim 11 wherein the coiled spring includes one end attached to the power screw and another end connected to the housing.

13. The electromechanical strut of claim 12 wherein the coiled spring uncoils and recoils as the extensible shaft moves relative to the housing.

* * * * *